Figure 1:
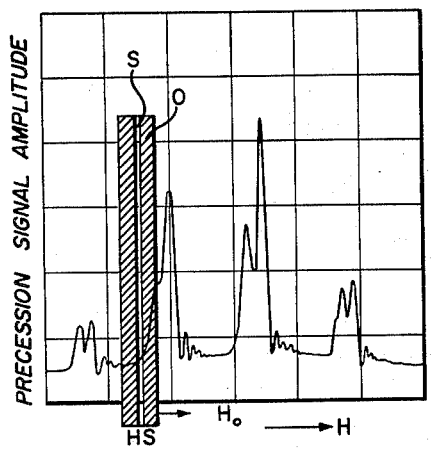

Oct. 29, 1963 R. H. VARIAN 3,109,138
GYROMAGNETIC RESONANCE METHODS AND APPARATUS
Filed Aug. 29, 1956 2 Sheets-Sheet 1

PRECESSION SIGNAL AMPLITUDE
V.S.
MAGNETIC FIELD INTENSITY FOR HYDROGEN NUCLEI IN THE $CH_2$ GROUP OF $CH_3 CH_2 OH$ APPLYING A CONSTANT $\omega$ INVENTOR.
Russell H. Varian
BY
Paul B. Hunter
Attorney

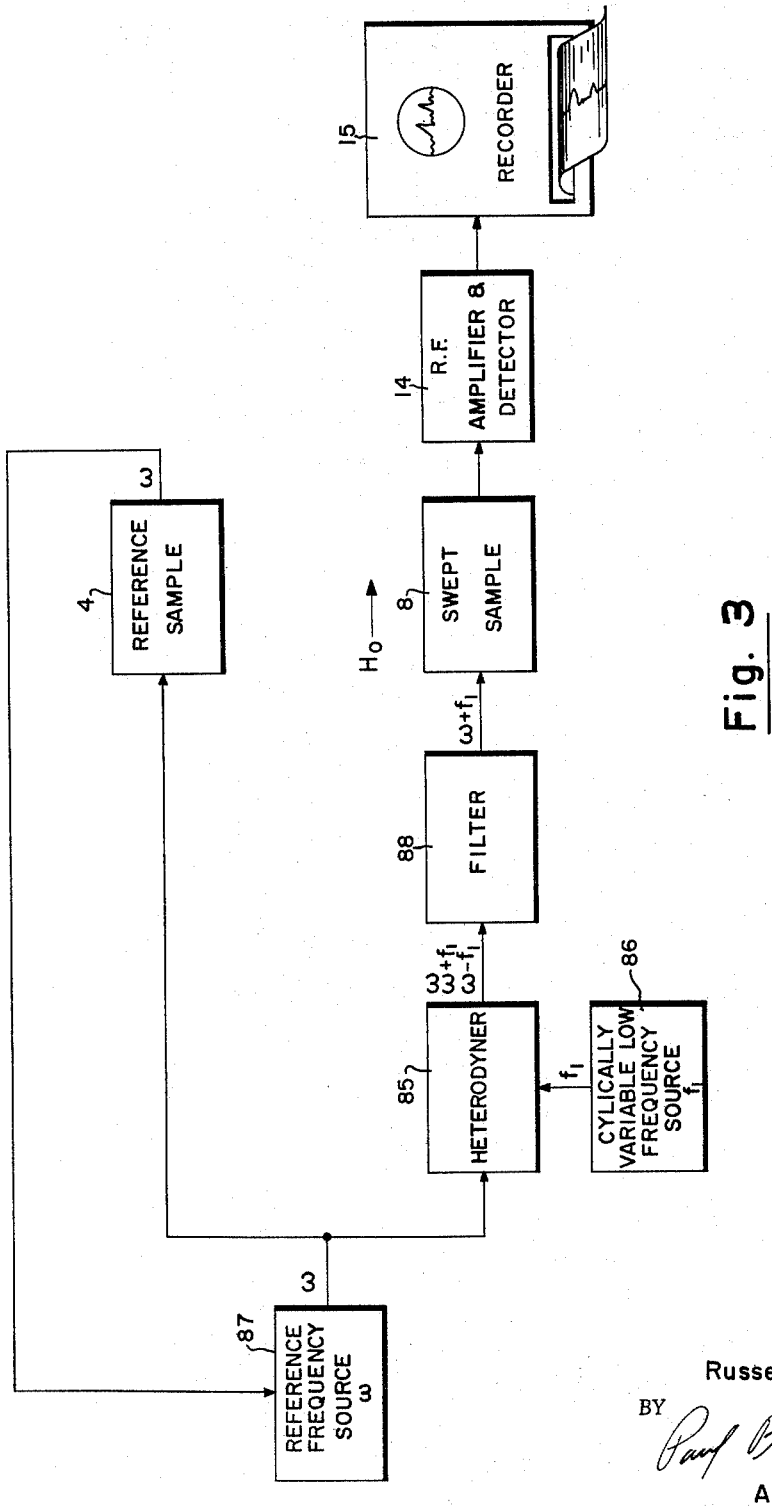

United States Patent Office 3,109,138
Patented Oct. 29, 1963

3,109,138
GYROMAGNETIC RESONANCE METHODS
AND APPARATUS
Russell H. Varian, Cupertino, Calif., assignor to Varian Associates, San Carlos, Calif., a corporation of California
Filed Aug. 29, 1956, Ser. No. 606,820
12 Claims. (Cl. 324—.5)

The present invention relates in general to gyromagnetic resonance methods and apparatus and more specifically to novel improved extremely stable high resolution methods and apparatus for obtaining reliable and precise gyromagnetic data used by chemists, physicists and industry to interpret molecular structures, to determine component percentages of substances, to control processes and to accomplish many other important tasks.

The present invention is applicable to gyromagnetic resonance in general and applies to all bodies which possess the properties of magnetic moment and angular momentum, such as, for example, nuclei (nuclear magnetic resonance), electrons (electron paramagnetic resonance), quadrupole nuclei (quadrupole resonance) and the like.

Heretofore a high resolution nuclear magnetic resonance spectrum was typically obtained in the following manner: the sample of matter to be analyzed such as, for example, ethyl alcohol ($CH_3CH_2OH$) was placed within a suitable holder and inserted between the pole faces of a powerful magnet producing a D.C. magnetic polarizing field $H_0$ of, for example, 7,500 gauss. The dynamic factor necessary for the spectrum was obtained by superimposing a small very low frequency magnetic sweep field $H_s$ upon the D.C. polarizing field $H_0$. A fixed frequency radio frequency magnetic field $H_1$ was applied to the sample through a transmitter coil at an angle of 90° to the direction of the polarizing field $H_0$. The action of the R.F. field $H_1$ on the nuclei of the sample, when the R.F. was at the Larmor frequency $\omega = \gamma H$ (where $\gamma$ is the gyromagnetic ratio, and $H$ is the total magnetic field intensity equal to $H_0 + H_s$), is to produce a phase-coherent forced precession of the nuclei. A receiver coil surrounding the sample normal to the transmitter coil had induced therein, by the precessing nuclei, an alternating signal voltage at the forced precessional frequency (Larmor frequency). The precessional signal was then amplified and detected to produce a D.C. signal voltage proportional to the amplitude of the forced precessions. It will be noted that a high amplitude D.C. signal corresponds to resonance of a particular group of gyromagnetic bodies and will be obtained only at precisely the correct combination of $\omega$ and total field intensity H.

Assuming that a spectrum of the hydrogen nuclei in $CH_3CH_2OH$ is being obtained in the polarizing field $H_0$ of 7,500 gauss the entire spectrum will be approximately 30 milligauss long.

In order to achieve high resolution without producing ringing of the high Q nuclei (shock excitation of the gyromagnetic bodies or resonators produces transient oscillations which will interfere with the resolution of the spectrum) it is necessary to sweep (vary H in a prescribed manner by varying $H_s$) through the spectrum at a slow rate. This high resolution sweep rate is substantially proportional to the square of the narrowest line width encountered in the spectrum. A representative high resolution sweep speed for the hydrogen nuclei spectrum of ethyl alcohol ($CH_3CH_2OH$, in a 7,500 gauss field would be approximately 0.8 milligauss per minute. Using this sweep speed a total sweep time of approximately 35 minutes is required to sweep through the entire ethyl alcohol spectrum. This length of sweep time requires that the time stability of the apparatus remain within one part in $10^8$ for the length of the sweep period, in this case 35 minutes. Heretofore, what this has meant more specifically was that the frequency $\omega$ of the alternating field $H_1$ must remain constant within one part in $10^8$ and the D.C. total field H must remain controlled within one part in $10^8$ for the sweep period.

These stability requirements have necessitated the use of extremely well regulated D.C. magnet power supplies when electromagnets are used, extremely stable crystal controlled oscillators and, recently, superstability (magnetic field control) coils all of which have contributed a considerable proportion of the total cost of high resolution equipment.

In the present invention resonance is excited in a first gyromagnetic substance disposed within a polarizing field $H_0$ or a polarizing field $H_0$ subject to substantially the same fluctuations with time as the polarizing field $H_0$ applied to a second sample under investigation. The gyromagnetic resonances of the substances will then vary in a like manner such that when they are compared minute fluctuations of the individual resonances due to the fluctuations of the polarizing field or other common environment are not observed because the two compared resonances have varied alike such that the differences, if any, in the resonances remains constant. In this manner the time stability and thus the resolution of the gyromagnetic apparatus is greatly enhanced.

The principal object of the present invention is to provide novel, improved and simplified gyromagnetic resonance methods and apparatus whereby the time stability of the apparatus may be greatly enhanced and whereby previously used costly components may be eliminated.

One feature of the present invention is the provision of a novel gyromagnetic resonance method and apparatus for examining gyromagnetic samples of matter wherein undesired minute fluctuations in the polarizing magnetic field $H_0$ may be compensated for by balancing resonance signals from a gyromagnetic resonance source subjected to the same polarizing field fluctuations.

Another feature of the present invention is the provision of at least two separate gyromagnetic samples wherein one of the gyromagnetic samples serves as the driving source of alternating electromagnetic energy for the other.

Another feature of the present invention is the provision of a novel means for obtaining a sweep of the gyromagnetic spectrum of a sample under investigation wherein the ratio of separate total unidirectional magnetic fields applied to the separate gyromagnetic samples is caused to vary in a prescribed manner to thereby obtain a sweep of the gyromagnetic spectrum of the sample under investigation.

Another feature of the present invention is the provision of a variable frequency side band generator for supplying a swept frequency side band A.C. magnetic field for sweeping through resonance of the sample group of gyromagnetic bodies to obtain spectral resonance information from the sample group.

Another feature of the present invention is a novel method and apparatus for observing the gyromagnetic properties of matter wherein resonance is excited in a plurality of gyromagnetic samples and the resonances compared whereby enhanced stability and resolution is obtained.

Figure 2:
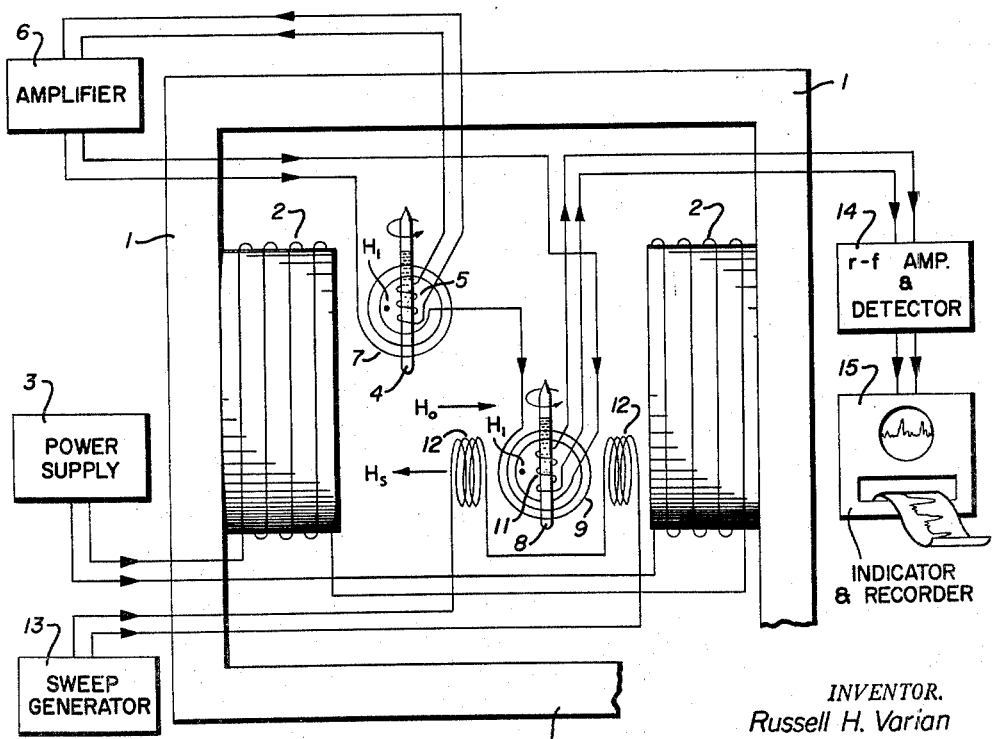

Other features and advantages of the present invention will become apparent after a perusal of the following specification as taken in connection with the accompanying drawings wherein, FIG. 1 is a replica of a nuclear magnetic resonance spectrum trace of the hydrogen nuclei in the $CH_2$ group of ethyl alcohol ($CH_3CH_2OH$) obtained in a 7,500 gauss polarizing field, FIG. 2 is a schematic block diagram of a novel gyromagnetic resonance spectrometer which embodies the present invention, and FIG. 3 is a schematic block diagram of a novel gyromagnetic resonance spectrometer which embodies an alternative sweep provision of the present invention.

Referring now to FIG. 1, the gyromagnetic resonance signal that is detected and recorded, as a trace, at any instant of time can be thought of as what one would see if he could look at the true gyromagnetic resonance spectrum through a very narrow slot S in an otherwise opaque slider O that is caused to slide directly over the spectrum at the sweep rate. In this manner it is easy to see what happens, to what would otherwise be an accurate and high resolution spectrum, if the slider begins to travel at a nonuniform rate over the spectrum. If a small flow fluctuation is superimposed on the slider sweep rate, portions of the spectrum will be lengthened or shortened in accordance with the fluctuation. If a rapid fluctuation is superimposed upon the steady slider rate an extremely low resolution, blurred, spectrum is obtained. This slider-spectrum idea is exactly analogous to what takes place when either the frequency $\omega$ of the applied magnetic field $H_1$ or the intensity of the polarizing field $H_0$ varies unintentionally, as by a transient present in the magnet power supply leaking through the power supply regulator and manifesting itself as a fluctuation in the polarizing field intensity $H_0$.

It will be noted that the distortion introduced in the observed spectrum is caused by the nonuniform or non-controlled rate of change in the gyromagnetic ratio of $\omega/H$. This is important because the present invention provides methods and means for preventing nonuniform rate of change and random fluctuations in the $\omega/H$ (gyromagnetic) ratio thereby greatly increasing the precision and resolution of the gyromagnetic resonance system.

Referring now to FIG. 2 there is shown in diagrammatic form a gyromagnetic spectrometer. An electromagnet 1 having field coil windings 2 provides a homogeneous, high intensity, and unidirectional polarizing magnetic field $H_0$. The field coil windings 2 derive their exciting current from a D.C. power supply 3. A reference or control gyromagnetic sample of matter 4 containing the gyromagnetic bodies, for example, nuclei, in abundance, for which a spectrum is to be obtained is disposed in the polarizing field region. A reference receiver coil 5 is wound around the reference sample holder such that its axis is at right angles to the direction of $H_0$. The reference receiver coil 5 is coupled to the input of an amplifier 6. The output of the amplifier 6 is coupled to a reference transmitter coil 7 position at right angles to the direction of the axis of the reference receiver coil 5 and $H_0$.

A sample of matter 8 to be investigated is also positioned in the polarizing field $H_0$. A sample transmitter coil 9 which may have its own gain and phase control networks associated therewith is tapped off the output of the amplifier 6 in series or parallel with coil 7, as desired, such that it operates at the same frequency as the amplifier 6. The sample transmitter coil 9 is positioned adjacent the gyromagnetic sample under investigation and also at substantially right angles to the direction of $H_0$. A sample receiver coil 11 is wound around the gyromagnetic sample 8 with its axis substantially at right angles to $H_0$ and to the axis of the sample transmitter coil 9. A sample magnetic sweep coil 12 is positioned substantially in axial alignment with $H_0$ and derives its sweep current from a sweep generator 13. When the sweep coil is excited it produces a magnetic field $H_s$. The sample receiver coil 11 is coupled to an amplifier and detector 14 which in turn is coupled to an indicator and recorder 15.

The gyromagnetic samples 4 and 8 may be rotated to average out small inhomogeneities in the total magnetic field permeating each sample to thereby increase the resolution of the precessional signals emanating from each.

In operation noise voltages developed in the reference receiver coil 5 and associated leads are amplified in the amplifier 6 and fed through the reference or control sample 4. The amplified noise signal contains an alternating voltage component at the Larmor frequency of the reference or control group of gyromagnetic bodies and will induce forced precessions of the reference or control gyromagnetic bodies in the total field H. These forced precessions induce a signal voltage in the reference receiver coil 5. The amplifier 6 and its associated transmitter coil 7 and receiver coil 5, because of the coupling therebetween through the gyromagnetic bodies (or nuclei) of the reference or control sample, operates like an oscillator, the frequency of which is proportional to the total field intensity H. Henceforth, the term "gyromagnetic oscillator" shall be defined to mean an amplifier having an input and output circuit regeneratively coupled together through the intermediary of a gyromagnetic substance. Thus, minute fluctuations in the polarizing field intensity $H_0$, where a magnetic polarizing field is used, cause corresponding compensating and offsetting fluctuations in the frequency $\omega$ of the gyromagnetic oscillator.

A portion of the amplified induced forced precessional signal is fed via the sample transmitter coil 9 to the sample of matter under investigation. Forced precession of the gyromagnetic bodies, if any, within the sample 8 under analysis are then received in the sample receiver coil 11, amplified and detected in the amplifier and detector 14 thereby obtaining a D.C. voltage proportional to the strength of the forced precessional signals. The D.C. voltage is then indicated and recorded in an indicator and recorder 15.

The polarizing field $H_0$ applied to the sample under investigation is shown modulated independently of the polarizing field $H_0$ applied to the reference or control sample. The field modulation is achieved by the superposition of a small sweep field $H_s$ provided by the sweep circuit. The sweep field $H_s$ causes the separate groups of gyromagnetic bodies within the sample under investigation to successively pass through a forced precession (resonance), thereby obtaining a gyromagnetic spectrum of the sample under investigation much the same as the spectrum of the hydrogen nuclei in the $CH_2$ group of $CH_3CH_2OH$ shown in FIG. 1.

It is readily apparent to those skilled in the art that the small sweep field $H_S$ may have been equally well applied to the reference or control sample of the gyromagnetic oscillator instead of the sample to sweep the frequency $\omega$ of the applied alternating magnetic field $H_1$ or to apply the sweep field equally to both samples but opposite in phase thereby obtaining the changing ratio of $\omega/H$ necessary for producing spectra traces. In addition, it is readily apparent that the sweep could have been obtained in other ways, the requirement being only that the gyromagnetic ratio of $\omega/H$ applied to the sample being swept be changed at the desired rate. For example (see FIG. 3) the magnetic field could have been left unaltered and the frequency applied to the swept sample 8 altered as by heterodyning in heterodyner 85 a reference frequency $\omega$ against a cyclically variable low frequency signal $f$, obtained from source 86 and filtering out one of the sidebands, either upper or lower, and applying this sideband to the sample 8 being swept.

Although the present invention has been shown and described as it is utilized with a crossed coils nuclear magnetic resonance system, other gyromagnetic systems, for example, the single coil twin T bridge or various single coil absorption systems, may be utilized to detect and apply the gyromagnetic resonance signals as taught by the present invention.

Moreover, the present invention has been described utilizing an R.F. source for exciting gyromagnetic resonance of the gyromagnetic bodies but it is readily apparent to those skilled in the art that resonance may also be excited in a number of other ways, such as, for example, by free precession techniques taught by Russell H. Varian in U.S. Patent Re. 23,769 entitled "Method and Means for Correlating Nuclear Properties of Atoms and Magnetic Fields," issued January 12, 1954.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of producing an extremely stable high resolution gyromagnetic resonance spectrum from a sample group of gyromagnetic bodies including the steps of, immersing a control group of gyromagnetic bodies and the sample group of gyromagnetic bodies in a common polarizing magnetic field subject to minute random intensity fluctuations with time, whereby a polarizing magnetic field having like random fluctuations with time is applied to both the control and sample groups of gyromagnetic bodies, applying an alternating magnetic field derived from a common A.C. source simultaneously to both said control and sample groups of gyromagnetic bodies to excite gyromagnetic resonance of said control and sample groups of gyromagnetic bodies in the applied polarizing magnetic field such that both groups are simultaneously subjected substantially alike to minute random frequency fluctuations of the common A.C. source, automatically controlling through the intermediary of the control group of gyromagnetic bodies the gyromagnetic ratio conditions applied to the sample and control groups of gyromagnetic bodies, such ratio conditions defined by the ratio of the frequency of the applied A.C. magnetic field to the intensity of the applied polarizing magnetic field, by automatically controlling the frequency of the applied A.C. magnetic field in a compensating response to offset minute random fluctuations in the polarizing magnetic field to sustain resonance of the control group in the polarizing magnetic field whereby the applied gyromagnetic ratio conditions are maintained free of random fluctuations, receiving from the resonant sample group of gyromagnetic bodies a gyromagnetic resonance signal whereby the sample resonance signal is free of the random fluctuations in both the polarizing magnetic field intensity and the frequency of the A.C. magnetic field, and sweeping the value of the automatically controlled and applied gyromagnetic ratio as applied to the sample group to produce successive time-displaced resonances of the certain different gyromagnetic groups, if any, within the sample group whereby an extremely stable and accurate gyromagnetic resonance spectrum of the sample is obtained.

2. A method according to claim 1 wherein the step of sweeping the value of the automatically controlled and applied gyromagnetic ratio as applied to the sample group includes the step of, heterodyning a variable low frequency signal with a reference signal to produce a variable frequency side band signal, applying the sideband signal to the sample group, whereby the detected gyromagnetic resonance signal of the sample group of gyromagnetic bodies contains spectral resonance information regarding the sample group of bodies obtained by sweeping the gyromagnetic ratio.

3. The method according to claim 1 wherein the step of sweeping the value of the automatically controlled and applied gyromagnetic ratio as applied to the sample group includes the step of, sweeping one of the polarizing magnetic field intensities as applied to the control and sample groups relative to the other polarizing magnetic field intensity, whereby the detected gyromagnetic resonance signal of the sample group of gyromagnetic bodies contains spectral resonance information regarding the sample group of bodies obtained by sweeping the polarizing magnetic field intensity through resonance of the sample group.

4. The method of producing a stable high resolution gyromagnetic resonance spectrum from a sample group of gyromagnetic bodies including the steps of, immersing a control group of gyromagnetic bodies and a sample group of gyromagnetic bodies in a common polarizing magnetic field subject to minute random intensity fluctuations with time, applying an alternating magnetic field derived from a common A.C. source simultaneously to both said control and sample groups of gyromagnetic bodies to excite gyromagnetic resonance of said control and sample groups of gyromagnetic bodies such that both groups are simultaneously subjected substantially alike to the minute random frequency fluctuations, if any, of the common A.C. source, automatically controlling through the intermediary of the control group of gyromagnetic bodies the gyromagnetic ratio of the frequency of the applied common A.C. magnetic field to the intensity of the common polarizing magnetic field as applied to both groups of gyromagnetic bodies to sustain resonance of the control group of gyromagnetic bodies and to maintain the applied gyromagnetic ratio conditions as applied to both groups of gyromagnetic bodies free of random fluctuations, receiving from the resonance sample group of gyromagnetic bodies the gyromagnetic resonance signal whereby the sample resonance signal is free of the random fluctuations in both the polarizing magnetic field intensity and in the frequency of the A.C. magnetic field, and sweeping the value of the automatically controlled and applied gyromagnetic ratio as applied to the sample group to produce successive time-displaced resonances of the certain different gyromagnetic groups, if any, within the sample group whereby an extremely stable and accurate resonance spectrum of the sample is obtained.

5. The method according to claim 4 wherein the step of sweeping the value of the gyromagnetic ratio as applied to the sample comprises the steps of, producing a variable low frequency signal, heterodyning the variable low frequency signal with a reference signal to produce a swept frequency side band A.C. magnetic field at the sample group of gyromagnetic bodies to produce side band resonance of said sample group of gyromagnetic bodies, whereby the received gyromagnetic resonance signal of the sample group of gyromagnetic bodies contains spectral resonance information regarding the sample group of bodies obtained by sweeping the side band signal through resonance of the sample group.

6. Apparatus for producing stable gyromagnetic resonance signals from a sample group of gyromagnetic bodies including, means for immersing a control group of gyromagnetic bodies and the sample group of gyromagnetic bodies in a common polarizing magnetic field subject to minute random intensity fluctuations with time such that both groups of gyromagnetic bodies will be subjected to substantially the same minute random intensity fluctuations of the polarizing magnetic field, means for providing an A.C. source, means for applying an A.C. magnetic field derived from said A.C. source simultaneously to both the control and sample groups of gyromagnetic bodies to excite gyromagnetic resonance of the control and sample groups of gyromagnetic bodies such that both the groups of gyromagnetic bodies are subjected substantially alike to minute random frequency fluctuations of said common A.C. source, means operative through the intermediary of the control group of gyromagnetic bodies for automatically controlling the gyromagnetic ratio of the frequency of the common applied A.C. magnetic field to the intensity of the common polarizing magnetic field as applied to both groups to sustain resonance of said control group of gyromagnetic bodies and to maintain the gyromagnetic ratio as applied to both groups free of random fluctuations, means operative simultaneously with sustained resonance of said control group of gyromagnetic bodies for deriving from said resonance sample group of gyromagnetic bodies a gyromagnetic resonance signal, whereby the sample resonance signal is free of the random fluctuations in both said polarizing magnetic field intensity and the frequency of said A.C. magnetic field, and means for sweeping the value of the automatically controlled and applied gyromagnetic ratio as applied to the sample group to produce successive time-displaced resonances of the certain different gyromagnetic groups, if any, within the sample group, whereby an extremely stable and accurate resonance spectrum of the sample is obtained.

7. The apparatus according to claim 6 wherein said means for sweeping the value of the applied gyromagnetic ratio as applied to the sample group includes, means for deriving a variable frequency R.F. side band A.C. signal means for sweeping the frequency of the variable frequency side band signal, means for applying the A.C. R.F. side band signal to the sample group of gyromagnetic bodies to produce resonance thereof, whereby the received gyromagnetic resonance signal from the sample group of gyromagnetic bodies contains spectral resonance information regarding the sample group of bodies obtained by sweeping the frequency of the side band R.F. signal through resonance of the sample group.

8. The apparatus according to claim 6 wherein said means operative through the intermediary of the control group of gyromagnetic bodies for controlling the gyromagnetic ratio to sustain resonance of the control group includes, means for automatically controlling the frequency of the applied A.C. magnetic field in compensating response to and to offset minute random fluctuations in the intensity of the polarizing magnetic field to sustain resonance of the control group in the polarizing magnetic field, whereby the applied gyromagnetic ratio is maintained free of random fluctuations.

9. Apparatus for producing stable gyromagnetic resonance signals from a group of sample gyromagnetic bodies including; means for immersing a control group of gyromagnetic bodies and the sample group of gyromagnetic bodies in a common polarizing magnetic field subject to the same minute random intensity fluctuations with time; means for providing a source of A.C.; means for applying A.C. magnetic fields derived from said A.C. source simultaneously to both the control and sample groups of gyromagnetic bodies to excite gyromagnetic resonance of the control and sample groups of gyromagnetic bodies from said common A.C. source whereby both groups of bodies are subjected substantially alike to minute random frequency fluctuations of said common A.C. source; said common A.C. source including, an A.C. amplifier, input and output electrical circuits connected to said amplifier, said input and output circuits being regeneratively coupled together, to form an oscillator, through the intermediary of the control group of gyromagnetic bodies for automatically controlling the frequency of said A.C. source to automatically control the applied gyromagnetic ratio of the frequency of the applied A.C. magnetic field to the intensity of the polarizing magnetic field, whereby the applied gyromagnetic ratio as applied to both the control and sample groups of gyromagnetic bodies is maintained free of random fluctuations; and means operative simultaneously with sustained resonance of said control group of gyromagnetic bodies for deriving from said resonant sample group of gyromagnetic bodies the gyromagnetic resonance signal, whereby the sample resonance signal is free of the random fluctuations of both said polarizing magnetic field intensity and of the frequency of said A.C. magnetic field.

10. The apparatus according to claim 9 including, means for sweeping the value of the automatically controlled and applied gyromagnetic ratio as applied to the sample group to produce successive time-displaced resonances of the certain different gyromagnetic groups, if any, within the sample group, whereby an extremely stable and accurate resonance spectrum of the sample is obtained.

11. The apparatus according to claim 10 wherein said means for sweeping the value of the applied gyromagnetic ratio as applied to the sample group includes, means for deriving a variable frequency R.F. side band A.C. signal, means for applying the A.C. R.F. side band signal to the sample group of gyromagnetic bodies to produce resonance thereof, thereby the received gyromagnetic resonance signal from the sample group of gyromagnetic bodies contains spectral resonance information regarding the sample group of bodies obtained by altering the frequency of the side band R.F. signal through resonance of the sample group.

12. The apparatus according to claim 10 wherein said means for sweeping the value of the automatically controlled and applied gyromagnetic ratio as applied to the sample group includes, means for sweeping one of the polarizing magnetic field intensities as applied to the sample and control groups relative to the other applied polarizing magnetic field intensity, whereby the derived gyromagnetic resonance signal of the sample of gyromagnetic bodies contains spectral resonance information regarding the sample group of bodies obtained by sweeping the polarizing magnetic field intensity through resonance of the sample group.

References Cited in the file of this patent

UNITED STATES PATENTS

| | | |
|---|---|---|
| 2,589,494 | Hershberger | Mar. 18, 1952 |
| 2,602,835 | Hershberger | July 8, 1952 |
| 2,837,649 | Hershberger | June 3, 1958 |
| 2,912,641 | Ruble | Nov. 10, 1959 |

FOREIGN PATENTS

| | | |
|---|---|---|
| 727,129 | Great Britain | Mar. 30, 1955 |
| 745,873 | Great Britain | Mar. 7, 1956 |
| 746,114 | Great Britain | Mar. 7, 1956 |

OTHER REFERENCES

Thomas et al.: Journal of Research of National Bureau of Standards, vol. 44, RP 2104, pp. 569–583, June 1950.

Gutowsky et al.: Journal of Chemical Physics, vol. 19, No. 10, October 1951, pp. 1259–1267.

Gutowsky et al.: Review of Scientific Instruments, vol. 24, No. 8, pp. 644–652, August 1953.

Shoolery et al.: Journal of Chemical Physics, vol. 23, No. 5, May 1955, pp. 805–811.